United States Patent [19]

Eustache

[11] Patent Number: 4,959,883
[45] Date of Patent: Oct. 2, 1990

[54] WINDSHIELD WIPER DEPLOYMENT SYSTEM USING THE WIPER MOTOR

[75] Inventor: Jean-Pierre Eustache, Antony, France

[73] Assignee: Valeo Systemes d'Essuyage, Montigny-Le-Bretonneux, France

[21] Appl. No.: 520,503

[22] Filed: May 8, 1990

[30] Foreign Application Priority Data

May 9, 1989 [FR] France ................ 89 06060

[51] Int. Cl.$^5$ .............................. B60S 1/02; B60S 1/26; B60S 1/36
[52] U.S. Cl. .................... 15/250.35; 15/250.16; 15/250.19
[58] Field of Search .......... 15/250.35, 250.34, 250.31, 15/250.16, 250.19

[56] References Cited

U.S. PATENT DOCUMENTS 4,780,926 11/1988 Kondo et al. .................... 15/250.21
4,783,876 11/1988 Souma et al. .................... 15/250.17

FOREIGN PATENT DOCUMENTS 0235434 9/1987 European Pat. Off. .

OTHER PUBLICATIONS

Patent Abstracts of Japan, vol. 8, No. 191, JP 59081240.

Primary Examiner—Harvey C. Hornsby
Assistant Examiner—Gary Graham
Attorney, Agent, or Firm—Dennison, Meserole, Pollack & Scheiner

[57] ABSTRACT

The invention relates to arrangements for deploying and folding a blade carrier of a windshield wiper mechanism of the retractable type, in particular for vehicles. A windshield wiper installation includes a deployable and foldable blade carrier which is driven in rotation during wiping by means of a drive spindle actuated by a wiper motor. A deployment mechanism is provided to move the blade carrier from a folded position to a deployed position and vice versa.

It is the wiper motor itself which serves to actuate the deployment and folding of the blade carrier. To this end, the system includes a second spindle which is coaxial with the drive spindle that drives the wiper in its actual wiping movement. A clutch is also provided for coupling the two spindles together for the wiping operation, and for uncoupling them from each other for deployment and folding of the blade carrier.

7 Claims, 2 Drawing Sheets

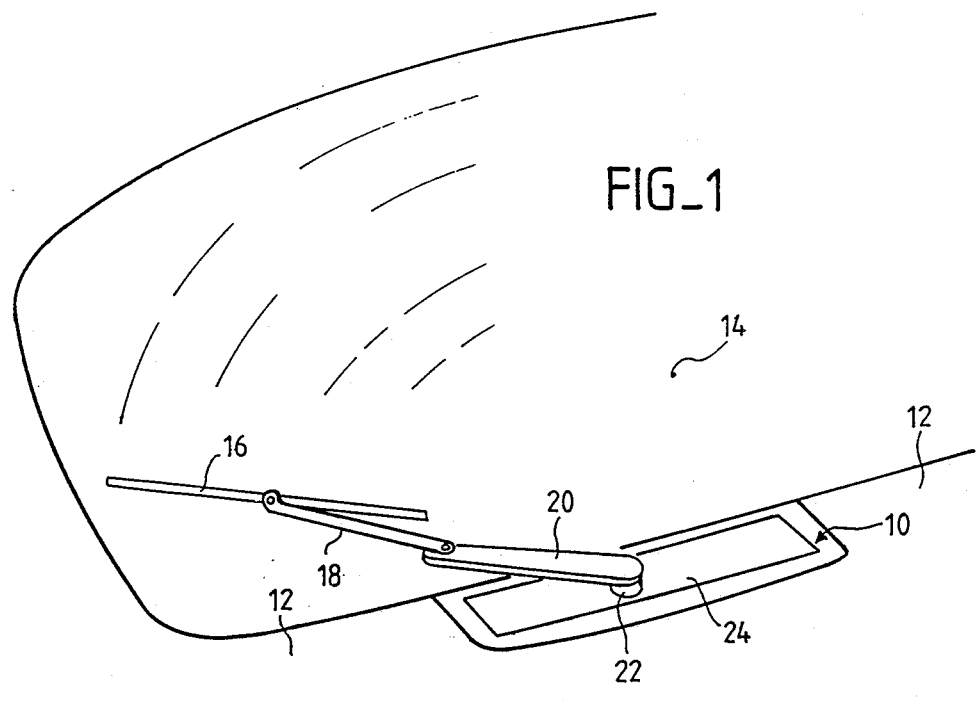
FIG_1
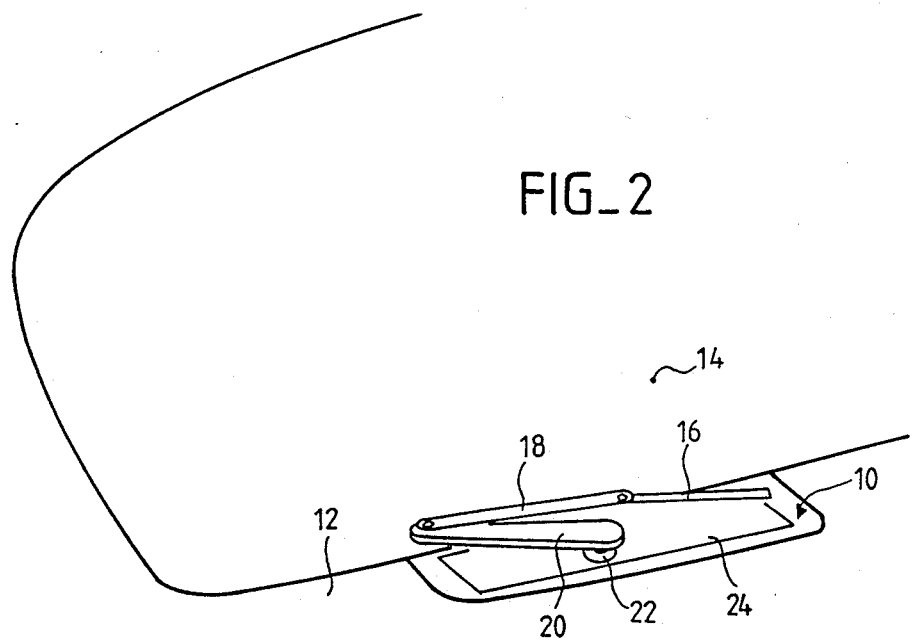
FIG_2

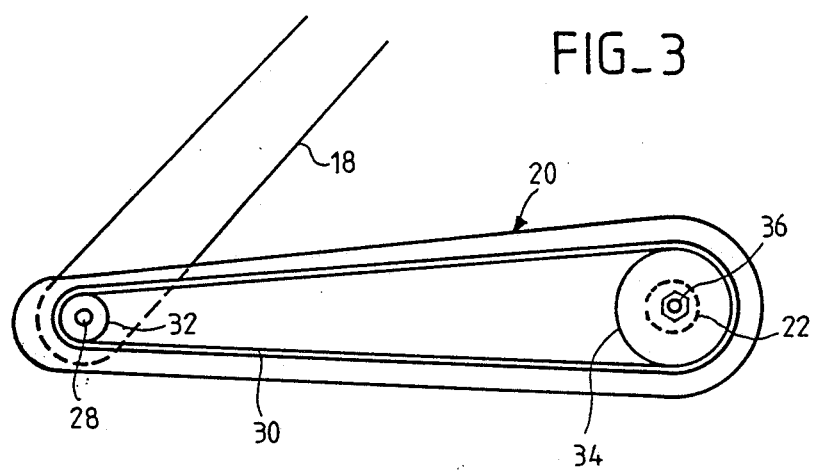
FIG_3
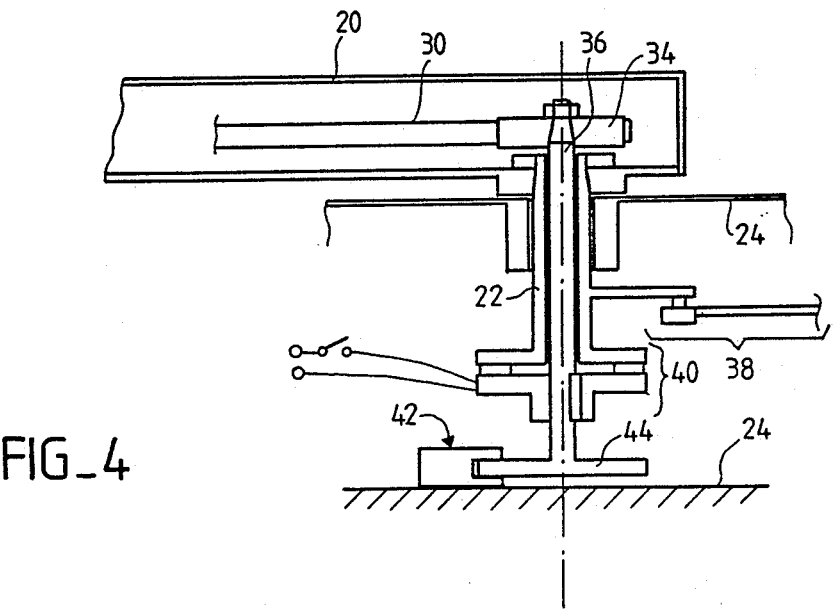
FIG_4

WINDSHIELD WIPER DEPLOYMENT SYSTEM USING THE WIPER MOTOR

FIELD OF THE INVENTION

The present invention relates to windshield installations for automotive vehicles, of the kind comprising a retractable wiper which includes a blade carrier that can be folded back and deployed; and to arrangements for effecting the folding back and deployment of the blade carrier. The invention is however applicable also in contexts other than windshield wiper installations, and other than vehicles, in which there is a need to fold one member back against another.

BACKGROUND OF THE INVENTION

Proposals have been made for providing vehicles with retractable windshield wiper installations such that the wiper mechanism is parked in a closed housing below the hood of the vehicle, when the windshield wiper is out of use. When it is required for use, a motorised deployment mechanism is actuated so as to move the blade carrier out of the housing, and to put the various components of the installation into an appropriate position for wiping the glass of the vehicle.

In order to provide a system of this kind, it is necessary in particular to overcome the problem of how to fold the support for the wiper blade. In practice the wiper blade itself is carried by a blade carrier which is articulated to a blade carrier support, and the length of the latter and the blade carrier, taken together, is too large to enable it to be easily parked without the blade carrier being first folded back. Systems have already been proposed in which the blade carrier, articulated to the end of a blade carrier support arm, may be either folded back along this arm or deployed so as to form effectively an extension of the arm. A deployment motor, which is actuated at the instant when deployment or folding is required, causes the blade carrier to move from its folded position to its deployed position and vice versa. When the glass of the vehicle is to be wiped by the blade, the blade carrier is in its deployed position, and a wiper motor drives the arm and blade carrier together in an oscillating rotating movement, first in one direction and then in the other.

It happens that the wiper motor must drive, in rotational movement, an assembly the inertia of which is substantially greater than would be the case in non-retractable windshield wipers of the conventional type, because of the numerous additional components which are made necessary by the deployment and folding mechanism. In an oscillating wiper system in which it is necessary periodically to reverse the direction of rotation of the assembly, the inertia of the driven assembly is a very major factor to be taken into account.

DISCUSSION OF THE INVENTION

An object of the present invention is to provide a system for deployment and folding in which the driven, i.e. displaceable, assembly has a smaller inertia than the arrangements hitherto proposed, so as to avoid excessive loading of the wiper motor; or alternatively so as to avoid any requirement for the wiper motor to be unnecessarily large.

A further object of the invention is to provide an arrangement for deployment and folding which will be relatively simple and not unduly expensive, while at the same time being reliable.

Accordingly, the invention provides a windshield wiper installation with a folding blade carrier, comprising a blade carried by a blade carrier which is articulated to a blade carrier support arm that is driven in rotation by a drive spindle mounted on a support plate, with a deployment mechanism actuated by a deployment motor to cause the blade carrier to move from a folded position to a deployed position and vice versa, characterised in that the deployment motor is a wiper motor which is adapted to drive the drive spindle in rotation so as to effect the wiping operation, and in that a device is provided having at least two couplings which allow the deployment mechanism to be connected to the wiper motor so as to carry out a deployment or folding operation actuated by the said motor, or, selectively, to allow the deployment mechanism to be disconnected so that the wiping operation can be performed.

More precisely, the windshield wiper installation in accordance with the invention preferably comprises:
a support plate on which a drive spindle, coupled to a wiper motor, is mounted for rotation,
a blade carrier support arm which is fixed to the drive spindle for rotation therewith,
a blade carrier which is articulated to one end of the said arm and which is displaceable between a folded position and a deployed position, and
a deployment mechanism for the blade carrier,
and the deployment mechanism comprises a second drive spindle coaxial with the first mentioned drive spindle, while one of the said couplings is arranged to couple the two said spindles together in rotation and to uncouple them.

Preferably, the other one of the said couplings is arranged to secure and release the second drive spindle with respect to the support plate.

In accordance with a further feature of the invention, the installation includes means for actuating one of the said couplings while the other is inactive, and vice versa.

In practice, one of the said couplings is a clutch, while the other is a brake.

The clutch and the brake are preferably controlled by electrical control means.

The construction of an installation in accordance with the invention is particularly simple, eliminates one of the two motors, and economises on the size of the other motor. The wiper motor does not have to support a large inertia when it is operating in the wiping mode.

Further features and advantages of the invention will appear from a reading of the detailed description which follows, and which is given by way of example only and with reference to the accompanying drawings.

BRIEF DESCRIPTION OF THE DRAWINGS

FIG. 1 shows a general view of a retractable windshield wiper installation in the deployed position.

FIG. 2 shows a view of the installation in the folded position.

FIG. 3 shows a diagram of the deployment mechanism for a retractable windshield wiper installation in accordance with the invention, seen looking along the axis of the rotational wiping movement.

FIG. 4 shows a transverse cross section of the same windshield wiper installation, in a plane containing the axis of the rotational wiping movement.

DESCRIPTION OF A PREFERRED EMBODIMENT OF THE INVENTION

The general views seen in FIGS. 1 and 2 simply show a retractable windshield wiper installation in general terms. In FIG. 1, the wiper is in its deployed position, while in FIG. 2 it is in its folded position.

The wiper may be retracted into a housing 10 formed in the hood 12 of the vehicle, in front of the glass 14, i.e. the windshield, which is to be swept. The wiper blade 16 is secured on a blade carrier 18 which is articulated to the end of a blade carrier support arm 20. The latter is arranged to be driven in oscillating rotational movement by means of a drive spindle 22, which is preferably located at the other end of the arm. The spindle 22 is mounted on a support plate 24. This plate is the main support element for the whole installation. It carries, in particular, the wiper motor (also referred to as a sweep motor) which drives the spindle 22 in rotation. Preferably, the support plate 24 is lowered down into the housing 10 when the wiper is retracted. It is raised, and remains in its raised position, when the wiper is to operate.

In the deployed position, the blade carrier 18 effectively forms an extension of the arm 20 (FIG. 1). In the folded position, ready for retraction into the housing, the blade carrier 18 is folded back along the arm 20, so that the assembly of the arm and blade carrier occupies a reduced space and can then enter into the housing 10.

The blade carrier 18 is only displaced with respect to the arm 20 in order to move from the folded position to the extended or deployed position, and vice versa. However, during the normal wiping movement, the blade carrier is essentially fixed with respect to the arm 20 so as to be rotated with it, these two members thus forming an assembly which is substantially rigid and which enables the wiper blade to be driven over the glass 14.

The movement of the blade carrier from the folded position to the deployed position and vice versa is commonly obtained by means of an electric motor which may be referred to as a deployment motor. This deployment motor has to ensure the pivoting movement of the blade carrier 18 about an axis which is situated at one end of the arm 20. Arrangements which have been hitherto proposed for carrying out this operation use a deployment motor which is actually fixed on the blade carrier support arm itself. Its inertia contributes to the total inertia of the assembly consisting of the support arm, the blade carrier and the blade, which thus necessitates a wiper motor of a higher power rating.

In accordance with the present invention, the deployment motor is eliminated, and the wiper motor itself is used to effect the deployment and folding actions. An arrangement of this kind is shown in FIGS. 3 and 4, which are merely diagrammatic drawings illustrating the essential features of the deployment and folding mechanism.

Referring to FIG. 3, the blade carrier support arm 20 and the blade carrier 18 are shown with the latter partly folded back along the former. The arm 20 is fixed to the drive spindle 22 which is arranged at one end of the arm; during the wiping movement, the spindle rotates and drives the arm. The blade carrier 18 is pivoted to the other end of the support arm 20, about a pivot axis 18 which is secured to the arm. The coupling mechanism between the support arm and the blade carrier includes, by way of example, a belt 30 which passes over a pulley 32, which is rotatably mounted around the axis 28, and also round a pulley 34 which is mounted for rotation about the axis of the spindle 22. The pulley 32 is fixed to the blade carrier 18, in such a way that its rotation about the axis 28 causes the blade carrier 18 to swing between its folded position and its deployed position.

The pulley 34 is secured to a drive spindle 36 which is coaxial with the spindle 22 and passes through it. Rotation of the blade carrier support arm 20 with respect to the spindle 36 drives the belt 30 and causes the blade carrier 18 to move from its folded position to its deployed position, or vice versa. The belt 30 is preferably of the toothed kind.

Other coupling mechanisms between the arm 20 and the blade carrier 18 may be provided, for example a mechanism with a cam mounted in place of the pulley 34, with this cam acting on a longitudinal finger which extends along the arm itself and which carries at its end a rack cooperating with a toothed wheel fixed to the blade carrier 18. Rotation of the support arm 20 then exerts a longitudinal thrust on the finger so as to advance the rack, to rotate the toothed wheel and therefore to swing the blade carrier with respect to the support arm. The finger is returned by a spring for movement in the opposite direction when the cam is rotated the other way.

FIG. 4 shows a transverse cross section of the installation in a plan containing the axes of the pulleys 32 and 34. In this Figure, it can be seen that the drive spindle 22, which is fixed to the support arm 20, is mounted rotatably on the support plate 24, that is to say its general position is fixed with respect to the support plate, and the drive spindle 22 can rotate on its axis in this position. Similarly, the other drive spindle 36, which is fixed to the pulley 34 and which is coaxial with the spindle 22, is rotatably mounted within the latter.

The spindle 22 is arranged to be driven in rotation to effect an oscillating wiping movement of the blade carrier support arm 20, by means of a wiper motor, not shown. The wiper motor is secured to the support plate 24, and a transmission mechanism is provided between this motor and the spindle 22. The transmission mechanism shown by way of example in FIG. 4 is a crank mechanism generally designated by the reference numeral 38: it may comprise toothed wheels, conical transmission elements, and so on, in accordance with the requirements of particular applications.

A device having at least two couplings, in this example two couplings 40 and 42, allows the deployment mechanism 30, 32, 34, 36 to be connected, via the spindle 22 and mechanism 38, to the wiper motor (which also of course serves as a deployment motor). This coupling device thus also allows the deployment and folding operations to be actuated by the motor, and the deployment mechanism to be then disconnected so that wiping can be performed.

One of the couplings, in this example a clutch 40, enables the two spindles 22 and 36 to be coupled together and uncoupled from each other. The clutch 40 may take a very simple form, for example it may comprise a first clutch plate, which is fixed to the spindle 36 for rotation with the latter while being free to move in translation along the axis of this spindle; together with a second clutch plate which is fixed with respect to the spindle 22. The clutch 40 is controlled, in this example, by an electromagnet which is disposed between the two plates of the clutch 40, and which brings the two clutch plates together so as to couple the spindles 36 and 22 in common rotational movement. The other coupling 42 is a brake, which is fixed to the support plate 24. The brake 42 is preferably an electric brake, and acts on the spindle 36 for driving the pulley 34. The brake 42 acts, for instance, on a disc 44 which is mounted at one end of the spindle 36, with respect to which it is fixed.

The installation operates in the following manner. On starting, the clutch 40 is engaged and the brake 42 is released. The support plate 24 is raised from its position inside the hood of the vehicle, in preparation for starting the operation of the windshield wiper. During this movement of the support plate, no deployment takes place, because there is no relative movement between the spindles 36 and 22. In consequence, the pulley 34 does not rotate with respect to the blade carrier support arm 20, and the blade carrier 18 therefore remains folded back. The wiper motor is then actuated by engaging the brake 42 and releasing the clutch 40. The engaged brake prevents the spindle 36 from turning, but the wiper motor sets the spindle 22 and the support arm 20 in rotation. A relative movement thus takes place between the two spindles, and the blade carrier support arm 20 is rotated. Because the spindle 36 is prevented from rotating, this rotation of the arm 20 causes the pulley 32 to rotate about the axis 28 under the action of the belt 30, so that the blade carrier 18 swings into its deployed position. This movement is not counteracted by the clutch 40, since the latter is disengaged. Once the deployed position has been reached, the brake 42 is released and, at the same time, the clutch 40 is reengaged. The spindles 22 and 36 are now coupled for rotation together and therefore begin to rotate simultaneously. The pulley 34 no longer rotates with respect to the arm 20, but maintains the blade carrier 18 in its deployed position despite the rotation of the spindle 22. The brake, being released, does not counteract this movement.

For the folding operation, the steps of the process described above are exactly reversed, the clutch being released and the brake being engaged. This is of course carried out during a movement of the blade carrier support arm in a direction such that the belt 30 moves in the other direction.

What is claimed is:

1. A windshield wiper installation comprising a support plate, a wiper motor carried on the support plate, a first drive spindle mounted rotatably on the support plate, means coupling the first drive spindle with the motor for driving the former in a wiping movement, a blade carrier support arm fixedly carried by the first drive spindle, a blade carrier articulated to the support arm, a wiper blade carried by the blade carrier, and a deployment mechanism at least partly carried by the support arm and coupled with the blade carrier for deploying the latter from, and for folding it back against, the former, wherein the installation further comprises at least two couplings releasably coupling the deployment mechanism with the wiper motor, whereby the deployment and folding back of the blade carrier can be actuated by the wiper motor without a wiping action in one condition of the said couplings, with, in an opposite condition thereof, the deployment mechanism disconnected so that the wiper motor can actuate a wiping operation.

2. An installation according to claim 1, wherein the deployment mechanism includes a second drive spindle coaxial with the first drive spindle, a first said coupling being carried by the said spindles for releasably coupling them together.

3. An installation according to claim 2, wherein a second said coupling is carried partly by the second drive spindle and partly by the support plate, for releasably securing the former with respect to the latter.

4. An installation according to claim 1, further comprising means for actuating the said couplings whereby a first said coupling is operative while a second said coupling is inactive, and vice versa.

5. A windshield wiper installation according to claim 1, wherein one of the said couplings is a clutch, while the other is a brake.

6. A windshield wiper installation according to claim 5, wherein the brake is controlled by electrical control means.

7. A windshield wiper installation according to claim 5, wherein the clutch is controlled by electrical control means.

* * * * *